United States Patent Office 3,787,465
Patented Jan. 22, 1974

3,787,465
ESTERS OF PENTAERYTHRITOL AND PROCESS FOR PREPARING
Travis E. Stevens, Huntsville, Ala., assignor to Rohm & Haas Company, Philadelphia, Pa.
No Drawing. Filed May 5, 1960, Ser. No. 27,217
Int. Cl. C07d 105/06
U.S. Cl. 260—440   6 Claims This invention concerns methods for selective partial esterification of pentaerythritol. More particularly, it concerns the preparation of monoethylenically unsaturated polymerizable pentaerythritol derivatives. It also concerns the preparation of monoethylenically unsaturated polymerizable pentaerythritol derivatives which are high energy compounds.

One such prior art instance of selective partial esterification of pentaerythritol is its selective nitration to form pentaerythritol trinitrate. However, known processes for selectively producing the trinitrato ester of pentaerythritol involve direct nitration of pentaerythritol with mixed sulfuric and nitric acids under carefully controlled conditions. Even with such careful control, however, prior art processes give low yields due to the formation of quantities of the tetranitrato ester.

When using organic acids to prepare their corresponding pentaerythritol monoesters, the prior art processes employ one mole of the organic acid per mole of pentaerythritol using prolonged reaction times in order to get the desired disproportionation. Although the product may be predominantly the monoester, there are present varying and appreciable amounts of the polyesters. The product is a complex mixture, very difficult to purify.

Monoesters of pentaerythritol are of interest because the three hydroxyl groups in the molecule have a strong water-solubilizing effect, making it possible to use such esters from water solutions as textile sizes, etc. Unsaturated monoesters of pentaerythritol are of particular interest because by polymerizing them, polymers with a high hydroxyl group content can be prepared. By copolymerizing such unsaturated monoesters with other ethylenically unsaturated monomers, copolymers with controlled hydroxyl content can be prepared. This makes possible controllable hydrophilicity, so that the water-resistance of the polymers can be varied at will.

The monoethylenically unsaturated pentaerythritol esters which contain three nitrato groups are high energy compounds valuable as binders for propellants.

Other ester groups may replace the nitrato groups. Thus, acetic acid may replace the nitric acid to give a monoethylenically unsaturated triacetate ester which, in the case of pentaerythritol triacetate acrylate, is a crystalline solid, M.P. 56° to 57° C.

It has been found that many of the difficulties inherent in the prior art processes can be overcome by employing pentaerythritol arsenite as the starting material in the manufacture of pentaerythritol esters prepared by selective esterification. Pentaerythritol arsenite, postulated to have the Formula I:

(I) 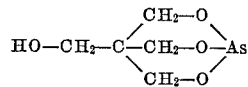

is a solid with a melting point of 106° to 107° C. and can be readily prepared by the method of Englund (B. Englund, J. prakt. Chem. 124, 191 (1930), which method comprises heating a mixture of arsenic trioxide and pentaerythritol and removing the water formed.

The compounds of the present invention are of the general formula

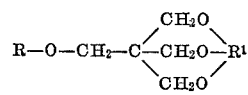

in which R is selected from the group consisting of

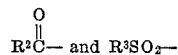

in which $R^2$ is alkyl, aryl, substituted aryl and alkenyl and alkenyl and $R^3$ is aryl and substituted aryl and $R^1$ is arsenic, and additionally represents

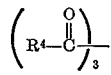

in which $R^4$ is lower alkyl when R is selected from the group consisting of acryloyl and methacryloyl. The compounds in which $R^1$ is As can be formed by reacting the acid halides, the sulfonyl halides or anhydrides of the desired acids with pentaerythritol arsenite to form the esters of pentaerythritol arsenite. Suitable acid halides include acetyl chloride, butyryl chloride, benzoyl chloride, nitrobenzoyl chloride, acryloyl chloride, methacryloyl and itaconyloyl chlorides, as well as the corresponding bromides. Suitable sulfonyl halides include benzene sulfonyl chloride, toluene sulfonyl chlorides, and the corresponding bromides. Typical anhydrides include the anhydrides of acetic, butyric, acrylic, methacrylic, itaconic and succinic acids. In order to obtain good yields, the molar ratio of acid halide and sulfonyl halide to pentaerythritol arsenite must be a minimum of 1 to 1. See Table I for pentaerythritol esters prepared.

TABLE I.—PREPARATION OF PENTAERYTHRITOL ARSENITE ESTERS

| Arsenite ester | M.P., °C. | Yield, percent | Analysis | | | | | |
|---|---|---|---|---|---|---|---|---|
| | | | Calcd. | | | Found | | |
| | | | C | H | As | C | H | As |
| Acetate | 90–91.5 | 88 | 33.62 | 4.43 | 29.96 | 33.71 | 4.54 | 30.13 |
| Propionate | 55–57 | 48 | 36.68 | 4.96 | 28.36 | 36.05 | 5.07 | 28.95 |
| Caproate | 40–42 | 49 | 43.15 | 6.26 | 24.47 | 43.12 | 6.38 | 24.63 |
| Benzoate | 133–134 | 60 | 46.17 | 4.20 | 24.00 | 45.82 | 4.29 | 24.54 |
| Benzenesulfonate | 138–139 | 37 | 37.94 | 3.76 | 21.51 | 38.22 | 4.22 | 22.15 |
| p-Toluenesulfonate | 177–178 | 73 | 39.71 | 4.26 | 20.77 | 39.79 | 4.17 | 20.68 |
| m-Nitrobenzoate | 159–169 | 64 | 40.55 | 3.39 | | 40.14 | 3.47 | |
| Acrylate | 86–87 | 59 | 36.67 | 4.23 | 28.58 | 36.69 | 4.37 | 29.06 |
| Methacrylate | 83–84 | 42 | 39.15 | 4.75 | 27.13 | 39.22 | 4.87 | 26.50 |

When employing the lower alkanoic or alkenoic anhydrides for the preparations of the pentaerythritol arsenite monoesters, it is preferred to carry out the reaction in the presence of a base such as a tertiary amine. By maintaining an alkaline or basic medium, transesterification of the arsenite portion of the molecule is substantially prevented. Larger excesses of amine may be employed; but a ratio of 1 mole amine to one mole of anhydride is preferred.

The arsenite monoesters which have monoethylenic unsaturation can be employed as polymerizable monomers as such, or they may be hydrolyzed to give the corresponding trihydroxy esters. They may be treated with organic acid anhydrides or acid halides to produce monoethylenically unsaturated tetraesters in which three of the ester groups are the same. Thus, acetic anhydride gives the triacetate. The reaction of the monoethylenically unsaturated pentaerythritol arsensite with nitric acid to give the corresponding trinitrato ester is of particular value, since the product so produced contains no mono- or dinitrato esters, a serious shortcoming of the prior art processes as set forth hereinbefore.

When employing the acid halides or sulfonyl halides for the preparation of the pentaerythritol arsenite monoesters, the chloride is the preferred halide because of ready availability and ease of handling although the corresponding bromides are equally effective. The pentaerythritol arsenite is dissolved in a solvent which is inert under the reaction conditions, a hydrogen chloride scavenger such as an aliphatic amine or pyridine is added to the solution and the chloride slowly added thereto. Suitable solvents include acetonitrile, propionitrile, benzene, and chlorinated aliphatic and aromatic hydrocarbons. While it is necessary to use 1 mole of the amine per mole of acid halide as a hydrogen halide acceptor, an excess of amine may be used as solvent. Amines suitable as scavengers include tertiary amines such as triethylamine and pyridine.

The temperature of the reaction mixture is maintained at about 0° C. to about 100° C. A preferred range is from 25° C. to 70° C.

When employing the acid anhydrides for the transesterification or acylation of the pentaerythritol arsenite monoester it is preferred to use an acid esterification catalyst such as p-toluenesulfonic acid, sulfuric acid, boron trifluoride or aluminum chloride. These compounds are used in the amounts of 1 to 5% of the weight of the reaction mixture. Excess anhydride is employed, and the molar ratio of anhydride to the monoester should be from about 3 to 1 to about 6 to 1. The reaction temperature is in the range of 0° C. to 100° C. with 25° C. to 70° C. being preferred. The ester triacetates prepared are listed in Table II.

TABLE II.—PENTAERYTHRITOL MONOESTER TRIACETATES $$R-O-CH_2-C-(CH_2-O-\overset{O}{\underset{\|}{C}}-CH_3)_3$$

| | | Analysis | | | |
| | | Found | | Calc'd | |
| R | M.P. | C | H | C | H |
| --- | --- | --- | --- | --- | --- |
| Acetyl | *79° | | | | |
| Acrylyl | 56° | 52.41 | 6.71 | 53.16 | 6.37 |
| Benzoyl | 95° | 59.30 | 6.29 | 59.00 | 6.05 |
| p-Toluenesulfonyl | 70° | 51.92 | 5.93 | 51.91 | 5.81 |

*Lit. M.P. 79 (N. S. Mavans, D. E. Elrick and R. F. Preckel, J. Am Chem. Soc., 76, 1304 (1954)).

Preferential hydrolysis of the monoester of pentaerythritol arsenite to give the monoester of pentaerythritol can be accomplished by warming the arsenite ester with a mixture of water and a solvent such as acetone or a lower alkanol. The reaction mixture must be substantially neutral so that only the arsenite portion of the molecule is hydrolyzed. The reaction will occur slowly at room temperature or about 20–25° C., but heating to a maximum of about 50° C. is generally employed.

Hydrolysis can also be effected by adsorbing the arsenite monoester on silica gel in solvent and subsequent elution with another solvent or solvent mixture. Thus pentaerythritol arsenite p-toluenesulfonate, dissolved in methylene chloride was adsorbed on a column of silica gel packed in methylene chloride. The product was eluted with a mixture of methylene chloride and ethyl acetate and then with a methylene chloride-methanol mixture. Removal of the solvents gave the solid pentaerythritol monotoluenesulfonate. Some of the monoesters prepared are listed in Table III.

TABLE III.—PENTAERYTHRITOL MONOESTERS

| | | Analysis | | | |
| | | Calcd. | | Found | |
| Ester | M.P., °C. | C | H | C | H |
| --- | --- | --- | --- | --- | --- |
| Acetate | 69–70 | | | | |
| Propionate | 15–17 | 49.99 | 8.39 | 49.22 | 8.64 |
| Caproate | 20–22 | 56.39 | 9.47 | 56.27 | 9.98 |
| Benzoate | 86–87 | 59.44 | 6.71 | 59.27 | 6.84 |
| p-Toluenesulfonate | 73–74 | 49.64 | 6.25 | 49.15 | 6.15 |
| Benzenesulfonate | 60–62 | 47.81 | 5.84 | 48.11 | 6.06 |
| m-Nitrobenzoate | 120–121 | 50.52 | 5.30 | 50.10 | 5.59 |
| p-Nitrobenzoate | 141–142 | 50.52 | 5.30 | 50.61 | 5.16 |

Nitration of the arsenite monoester was effected by treatment of the arsenite monoester or a solution thereof with a large excess of concentrated (85–100%) nitric acid. The molar ratio of nitric acid to arsenite ester was from about 5 to 1 to about 10 to 1. The reaction temperature should be in the range of −10° C. to 20° C., 0° C. to 10° C. being the preferred range.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

Pentaerythritol arsenite

The procedure outlined by Engund [1] was followed using 54.4 grams (0.40 mole) of pentaerythiol and 39.6 grams (0.20 mole) of arsenic trioxide. The mixture began to melt at 80° and water began to distill from the flask when the reaction temperature reached 120°. The mixture was quickly heated to 230° and then allowed to cool. Distillation of the residue gave pentaerythritol arsenite (I), 77 g. (93%), B.P. 140° (1 mm.), M.P. 106° to 107° C.; reported, 102° to 103° C.

EXAMPLE II

Pentaerythritol arsenite acrylate

To a clear solution of 20.8 g. (0.10 mole) of pentaerythritol arsenite in 40 ml. of acetonitrile and 16 ml. of triethylamine was added dropwise a mixture of 9.1 g. (0.10 mole) of acryloyl chloride and 10 ml. of acetonitrile. The addition required 15 minutes and the temperature of the reaction mixture was maintained at 35° to 40° by external cooling. After the addition of the acryloyl chloride, 0.02 g. of diphenylphenylenediamine was added and the mixture was stirred at 50° for 2 hours. The solvent was then removed at reduced pressure and the residue dried at ambient temperature and 1 mm. for 30 minutes. (This step is important—it appears to avoid formation of a gummy product.) The residue was extracted three times with 200 ml. of hot ligroin containing 0.01 g. of hydroquinone. The ligroin extracts were combined and stripped to dryness. The residue was taken up in methylene chloride and again stripped to dryness to leave 20.0 g. of solid material. Recrystallization from ligroin gave 15.3 g. of product, M.P. 83°–84° C. An additional recrystallization from ligroin gave material, M.P. 86° to 87° C.

EXAMPLE III

Pentaerythritol arsenite acrylate

The arsensite acrylate also was prepared by the following procedure. To a mixture of 10.4 g. (0.050 mole) of

[1] B. England, J. prakt. Chem. 124, 191 (1930).

pentaerythritol arsenite and 10 ml. of acetonitrile was added 4.5 ml. (0.065 mole) of acrylic acid followed by 24 ml. (0.175 mole) of triethylamine. When the exotherm from the addition of the amine (the reaction temperature was not allowed to exceed 20°) had subsided, 7.7 ml. (0.060 mole) of benzenesulfonyl chloride in 10 ml. of acetonitrile was added over a 15 minute period. The reaction mixture was cooled to keep the temperature below 30° during the addition; after the benzenesulfonyl chloride addition, the mixture was stirred at 30° for one hour. The reaction was then worked up as above; by chilling the ligroin extracts pentaerythritol arsenite acrylate 7.4 g., M.P. 80° to 82° C. was obtained.

EXAMPLE IV

Pentaerythritol arsenite methacrylate

To a clear solution of 10.4 g. (0.050 mole) of pentaerythritol arsenite in 20 ml. of acetonitrile and 8 ml. of triethylamine was added dropwise a mixture of 5.5 g. (0.052 mole) of methacryloyl chloride and 5 ml. of acetonitrile. The addition required 15 minutes and the temperature of the reaction mixture was maintained at 35° to 40° C. by external cooling. The mixture was stirred at 50° for two hours, then the solvent was removed at reduced pressure and the residue dried at ambient temperature and 1 mm. for 30 minutes. The residue was extracted with three 100 ml. portions of hot ligroin (each containing 5 mg. of hydroquinone). These extracts were concentrated and chilled and the product removed by filtration. The solid obtained was recrystallized from ligroin to give 5.40 g. of pentaerythritol arsenite methacrylate, M.P. 83° to 84.5° C.

EXAMPLE V

Pentaerythritol arsenite Itaconate

Itaconyloyl chloride was substituted for the methacryloyl chloride of Example IV. Pentaerythritol arsenite itaconate was obtained in good yield.

EXAMPLE VI

Pentaerythritol arsenite p-toluenesulfonate

To a stirred solution of 10.4 g. of pentaerythritol arsenite in 20 ml. of pyridine 9.5 g. of p-toluenesulfonyl chloride was added portionwise. The reaction mixture slowly exothermed to 42°; when the exotherm subsided the mixture was maintained at 45–50° for 2 hrs. The excess pyridine was then removed at reduced pressure. The residue was triturated with 50 ml. of absolute methanol at 0°, and was then filtered to give pentaerythritol arsenite p-toluenesulfonate, 13.2 g., M.P. 170–173°. Recrystallization from methanol raised the M.P. to 177–178°.

EXAMPLE VII

Pentaerythritol arsenite propionate

A solution of 10.4 g. (0.05 mole) of pentaerythritol arsenite in 20 ml. of pyridine was cooled to keep the temperature of the reaction mixture below 30° while 4.5 ml. (0.51 mole) of propionyl chloride was added over a 5-min. period. The reaction mixture was stirred at 45–50° for 2 hrs., then excess pyridine and propionyl chloride were removed at reduced pressure. To the solid residue was added 150 ml. of ligroin and the mixture was refluxed for 15 min. The ligroin was decanted and chilled in Dry Ice, and was then filtered to remove a semisolid. Flash distillation of the semisolid at 130° (0.5 mm.) gave pentaerythritol arsenite propionate, 6.3 g., (48%), M.P. 55–57°.

EXAMPLE VIII

Pentaerythritol arsenite propionate-(anhydride method)

A solution of 10.4 g. (0.050 mole) of pentaerythritol arsenite in 40 ml. of pyridine was stirred at 30° while 7.2 g. (0.055 mole) of propionic anhydride was added over a 5 minute period. The mixture was stirred at 75° for one hour; the excess pyridine and anhydride were removed at reduced pressure. The residue was extracted with hot ligroin (150 ml.) and the ligroin extract was chilled in Dry Ice. Decantation of the ligroin left pentaerythritol arsenite propionate, 8.0 g.; the infrared spectra was identical with that of material prepared by the propionyl chloride method.

EXAMPLE IX

Hydrolysis of pentaerythritol arsenite esters

The method used to convert the arsenite esters of Table I to the pentaerythritol monoesters listed in Table III is illustrated by the procedure given below for the hydrolysis of pentaerythritol arsenite p-toluenesulfonate.

A 1.0 g. sample of pentaerythritol arsenite p-toluenesulfonate dissolved in methylene chloride was placed on a 1-in. by 6-in. column of silica gel packed in methylene chloride. The column was eluted with 200 ml. methylene chloride, 300 ml. of methylene chloride-ethyl acetate (9:1) and 500 ml. of methylene chloride-methanol (6:1). The solid eluted by the last eluent was recrystallized from ethyl acetateligroin to give pentaerythritol monotoluenesulfonate, 0.63 g., (75%), M.P. 73–74°.

EXAMPLE X

Pentaerythritol triacetate acrylate

To a suspension of two grams of pentaerythritol arsenite acrylate in 15 ml. of acetic anhydride was added two drops of concentrated sulfuric acid. A slightly exothermic reaction occurred and within one hour all material had dissolved. The mixture was allowed to stand at ambient temperatures for two hours. The oil which was isolated after hydrolysis of the excess acetic anhydride was taken up in ethyl acetate and washed with 5% sodium bicarbonate solution in water.

The residue obtained on evaporation of the ethyl acetate was recrystallized from ligroin to give pentaerythritol triacetate acrylate as white platelets, M.P. 56° to 57° C.

Treatment of the pentaerythritol methacrylate and itaconate with acetic anhydride using the process as set forth in Example VII gave the corresponding triacetate esters.

EXAMPLE XI

Trinitratopentaerythritol acrylate

A solution of 0.40 gram of urea in 50 ml. of 90% nitric acid was cooled to −3° and air-sparged until colorless. A solution of 5.0 gram of pentaerythritol arsenite acrylate in 15 ml. of methylene chloride was added dropwise over a 10-minute period. The reaction mixture was stirred at 0–3° for 30 minutes, then poured into 50 ml. of methylene chloride containing 100 grams of ice. Following filtration, the methylene chloride was separated and washed with ice water and cold sodium bicarbonate solution and then was dried over magnesium sulfate. Removal of the methylene chloride at reduced pressure left 6.0 grams (97%) of crude trinitratopentaerythrityl acrylate. The infrared spectrum of this product was identical with that of an authentic specimen. One recrystallization from methanol gave trinitratopentaerythrityl acrylate, 4.77 grams (77%) assaying 3.94% pentaerythritol tetranitrate, 94.23% trinitratopentaerythrityl acrylate, 1.66% diacrylate and 0.17% residue.

The trinitratopentaerythrityl acrylate was identified further by a mixed melting point with an authentic sample.

Treament of pentaerythritol arsenite methacrylate and itaconate with nitric acid using the process as set forth in Example XI gave the corresponding trinitrato pentaerythrityl methacrylates and itaconates. The same procedure was used to prepare pentaerythritol acetate trinitrate and pentaerythritol p-toluenesulfonate trinitrate from the corresponding monoesters of pentaerythritol arsenite.

I claim:
1. Pentaerythritol compounds of the formula

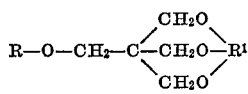

in which R is selected from the group consisting of

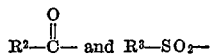

in which $R^2$ is selected from the group consisting of alkyl, aryl and alkenyl and $R^3$ is aryl and $R^1$ is arsenic.

2. The monoacrylic acid triacetic ester of pentaerythritol.

3. The monomethacrylic acid triacetic ester of pentaerythritol.

4. A process for the preparation of pentaerythritol compounds of the formula

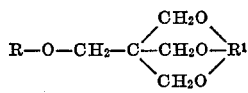

in which R is selected from the group consisting of

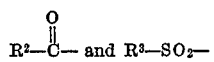

in which $R^2$ is selected from the group consisting of alkyl, aryl, and alkenyl and $R^3$ is aryl and $R^1$ is selected from the group consisting of arsenic and

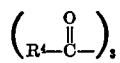

in which $R^4$ is selected from the group consisting of alkyl and aryl which comprises reacting pentaerythritol arsenite with a compound selected from the group consisting of $R^2COCl$, $(R^2CO)_2O$, and $R^3SO_2Cl$ in which compounds $R^2$ and $R^3$ are as defined hereinbefore at a temperature in the range 0 to 100° C.

5. A process for the preparation of monoethylenically unsaturated esters of pentaerythritol arsenite which comprises reacting (1) pentaerythritol arsenite at a temperature of from about 0° C. to about 100° C. with (2) a compound selected from the group consisting of organic acid halides and organic acid anhydrides of an acid selected from the group consisting of acrylic, methacrylic and itaconic acids and recovering the monoethylenically unsaturated pentaerythritol arsenite esters from the reaction mixture.

6. A process as set forth in claim 5 in which the organic acid halide is the acid chloride and said acid chloride is reacted in the presence of a tertiary organic amine as hydrogen chloride acceptor.

References Cited

UNITED STATES PATENTS

| | | | |
|---|---|---|---|
| 2,659,745 | 11/1953 | Vaughn | 260—440 |
| 2,843,614 | 7/1958 | Clemence et al. | 260—440 |
| 2,853,511 | 9/1958 | Boedecker et al. | 260—467 |
| 2,742,492 | 4/1956 | Harvey | 260—467 |
| 2,330,033 | 9/1943 | D'Alelio | 260—485 |
| 2,375,563 | 5/1945 | Kirk | 260—485 |
| 2,429,573 | 10/1947 | Wyler | 52—11 |
| 2,617,796 | 11/1952 | Vaughan | 260—112 |
| 1,583,658 | 5/1926 | Clarke | 260—488 J |
| 3,441,600 | 4/1969 | Chao et al. | 260—488 J |

FOREIGN PATENTS 904,593   2/1954   Germany _____ 260 Digest

OTHER REFERENCES

Berlow et al.: The Pentaerythritols, Reinhold Pub. Corp., New York, 1958, pp. 212 to 230.

LELAND A. SEBASTIAN, Primary Examiner

U.S. Cl. X.R.

149—93; 260—467, 469, 476 R, 478, 486 R, 488 J